Sept. 2, 1930.  W. GUTENKUNST  1,774,550
STOCK WATERING BOWL
Filed Sept. 11, 1926

INVENTOR.
William Gutenkunst,
BY
Morsell, Keeney & Morsell
ATTORNEYS

Patented Sept. 2, 1930

1,774,550

UNITED STATES PATENT OFFICE

WILLIAM GUTENKUNST, OF MILWAUKEE, WISCONSIN

STOCK-WATERING BOWL

Application filed September 11, 1926. Serial No. 134,918.

This invention relates to improvements in stock watering bowls, particularly of the type which may be readily removed from their supports for cleansing purposes.

It is the primary object of the present invention to provide a drinking bowl for stock which may be adjusted in interlocking engagement with a support in such a manner that it cannot be accidentally disengaged, although by a simple manipulation it can be readily removed by an attendant for the purpose of cleaning the same.

A further object of the invention is to provide a stock watering bowl which is held in detachable engagement with a support by means of a bracket engaging the bowl and a bolt engaging the bracket and bowl. I am aware that bowls utilizing a somewhat similar principle have been made heretofore, but in all such instances the arrangement is such that after the pin or bolt is removed the bowl will immediately drop free of the bracket if not supported and as it requires that the attendant use both of his hands in effecting the removal of a bolt or the like it is very difficult for him to conveniently support the bowl until the bolt is completely removed and prevent the bowl from dropping and breaking. Hence, my invention aims at the provision of a supporting structure for a bowl which will hold the bowl after the removal of the securing bolt or pin and does not completely release the bowl until the same is manually manipulated out of engagement.

A further object of the invention is to provide a bracket supporting member for a stock watering bowl which will prevent lateral movement of the bowl.

A further object of the invention is to provide a stock watering bowl having means for preventing an animal from displacing the valve pressure plate.

A further object of the invention is to provide a stock watering bowl which is of very simple construction, is easily attached and detached, is inexpensive to manufacture, is strong and durable, and is well adapted for the purposes described.

With the above and other objects in view the invention consists of the improved stock watering bowl, and its parts and combinations as set forth in the claims, and all equivalents thereof.

In the accompanying drawing in which the same reference characters indicate the same parts in all of the views.

Figure 1:
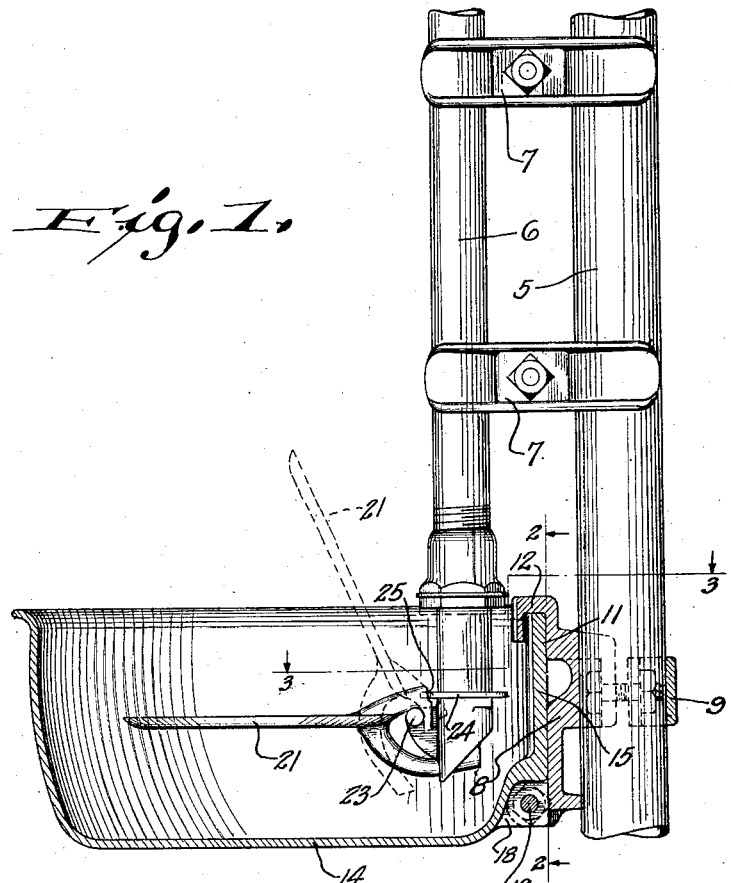
Fig. 1 is a view showing the improved stock watering bowl secured to a support, the bowl and bracket being shown in vertical section.
Figure 2:
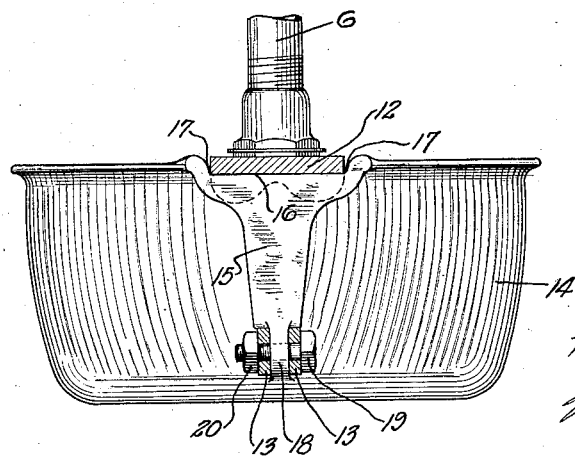
Fig. 2 is a sectional view taken on line 2—2 of Fig. 1.
Figure 3:
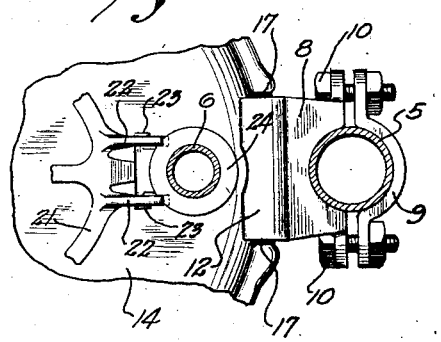
Fig. 3 is a sectional view taken on line 3—3 of Fig. 1.

Referring now more particularly to the drawing it will appear that the numeral 5 indicates a vertical support to which a supply pipe 6 is secured by members 7.

A bowl attaching bracket 8 is secured to the support 5 by means of a complementary plate 9 and bolts 10. The bracket 8 is provided with a flattened inner face 11 and a flanged hooking portion 12 at its upper edge portion. The lower portion of the bracket 8 is provided with a pair of spaced apart, inwardly projecting and apertured ears 13.

A stock watering bowl 14 is adapted to be engaged by said attaching bracket 8 and the rear of the bowl is flattened, as at 15, to engage squarely against the flattened inner face 11 of the bracket 8. The rim of the bowl is cut away at its rear, as at 16, to engage under the flanged hooking portion 12 of the bracket 8, and the shoulders 17 formed at the ends of the cut away portion 16 engage the ends of the hooking portion to prevent lateral movement of the bowl. The rear of the bowl, below the flattened portion 15, is formed with an apertured ear 18 adapted for engagement between the ears 13 of the bracket 8. When the bowl is in normal position, engaged by the bracket, it is secured thereto and against displacement by a bolt 19 extended through the registering apertures of the ears 13 and 18, said bolt having a nut 20 on its threaded end portion.

A valve pressure plate 21, of the conventional type, is employed within the bowl to operate, upon a depression thereof, valve mechanism within the supply pipe 6 to feed water to the bowl. As is usual, said pressure plate is formed with curved pivot arms 22 engaging projecting portions or lugs 23 extending from the supply pipe, forming a pivotal and detachable mounting for the pressure plate. Heretofore, trouble has been encountered with cattle nosing the plate and lifting it to an inoperative position. However, in the present structure this is avoided by a ring 24 slidably mounted on the lower end portion of the supply pipe. Said ring normally engages in recesses 25 in the inner end portion of the pressure plate and prevents an animal from lifting the plate. However, if an attendant desires to lift or remove the pressure plate it is merely necessary for him to slide the ring upwardly on the pipe to an out of the way position.

As is evident that the bowl is firmly and detachably supported from the support by means of the engagement with the bracket. To remove the bowl for cleaning purposes it is only necessary to remove the bolt 19 and then tip the bowl to unhook it from the hooking portion of the bracket. This structure provides a convenient and easily operated means for detachably holding the bowl and due to the hooking engagement between the bowl and bracket there is no danger of the bowl dropping and breaking after the bolt has been removed.

From the foregoing description it will be seen that the improved stock watering bowl is of very simple and novel construction, and is well adapted for the purposes set forth.

What is claimed as the invention is:

1. In a stock watering bowl supporting structure, a support, a bracket member carried thereby and having an upper hooking portion and a lower projecting supporting portion, a stock watering bowl removably supported by said bracket and having its upper edge in engagement with said hooking portion and held thereby against vertical movement and having a lower portion thereof resting on said supporting portion, and a securing member engaging a lower portion of the bowl and said supporting portion of the bracket and preventing tilting movements of the bowl, the securing member being entirely removable.

2. In a stock watering bowl supporting structure, a bracket member carried thereby and having an upper outwardly and downwardly projecting hooking portion and a lower projecting supporting portion therebeneath, a stock watering bowl removably engaged by said hooking portion and resting upon and supported by the outwardly projecting supporting portion, and a removable member engaging said supporting portion and a portion of the bowl for non-yieldingly locking the bowl to the bracket in rigid engagement with said hooking portion.

In testimony whereof, I affix my signature.

WILLIAM GUTENKUNST.